Jan. 15, 1963 R. R. BOCKEMUEHL ET AL 3,073,522
DIGITAL COUNTER
Filed July 30, 1959 2 Sheets-Sheet 1

INVENTORS
Robert R. Bockemuehl, &
BY Eugene C. Hanysz
C. R. Meland
ATTORNEY

Jan. 15, 1963  R. R. BOCKEMUEHL ET AL  3,073,522
DIGITAL COUNTER
Filed July 30, 1959  2 Sheets-Sheet 2
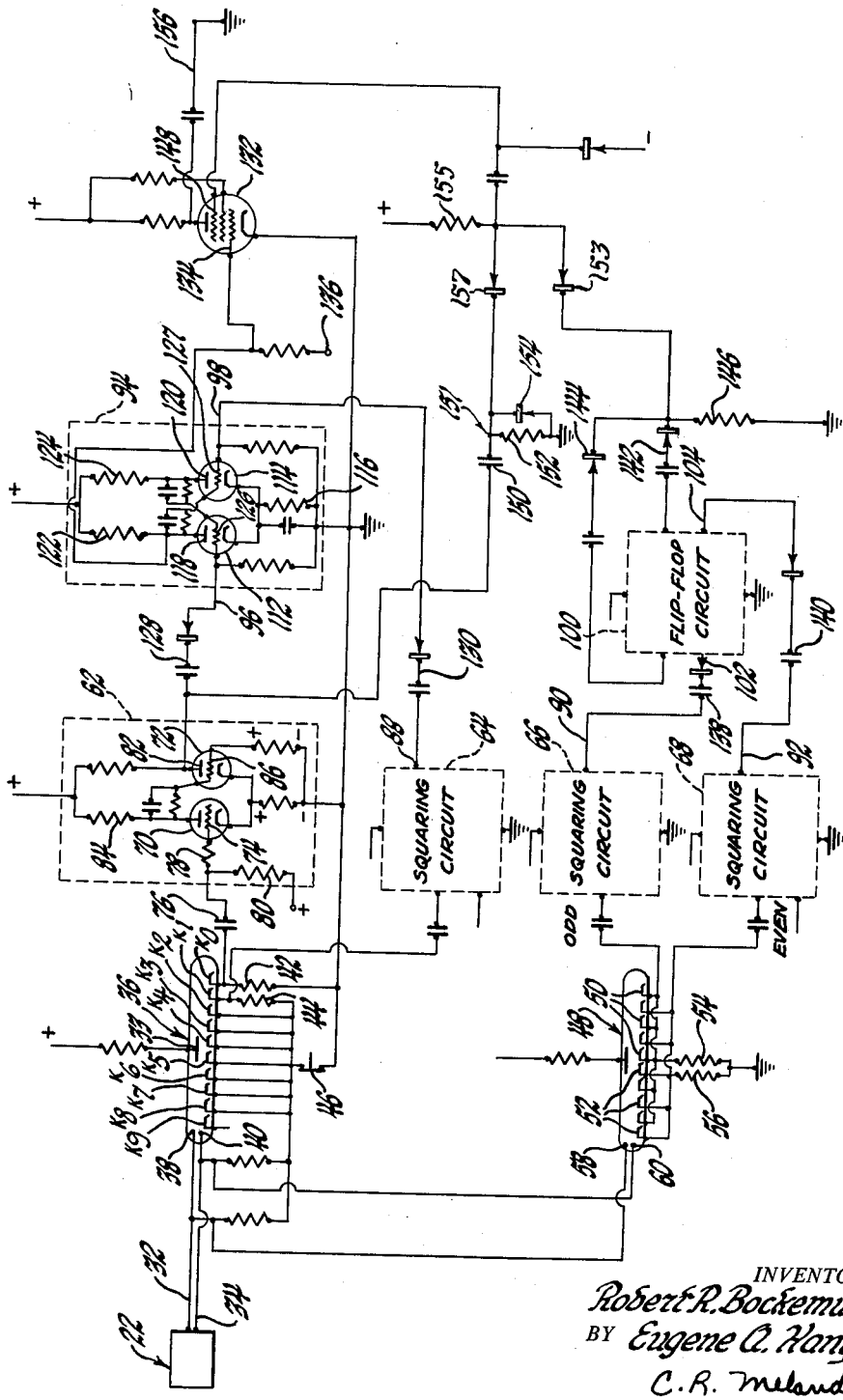
INVENTORS
Robert R. Bockemuehl, &
BY Eugene A. Hanysz
C. R. Meland
ATTORNEY

United States Patent Office 3,073,522
Patented Jan. 15, 1963

3,073,522
DIGITAL COUNTER
Robert R. Bockemuehl, Birmingham, and Eugene A. Hanysz, Royal Oak, Mich., assignors to General Motors Corporation, Detroit, Mich., a corporation of Delaware
Filed July 30, 1959, Ser. No. 830,499
11 Claims. (Cl. 235—92)

The present invention relates to electronic counters and, more particularly, to digital counters effective to record the net number of positive events.

Under certain circumstances it is desirable to follow the motion of a member such as a machine tool, a rotating shaft, etc. by digitally recording small increments of the member's movement. This can be a highly accurate method for following motion providing the count can be accurately made. Heretofore, the counters available have not been particularly adapted for use in such applications. In one form of counter the number of events are counted irrespective of their sense. Counters of this type can be employed when the motion is always in one direction. However, if the motion is reversible, such counters give erroneous and misleading results. To overcome this difficulty, counters may be employed which will only count events of one particular sense, i.e., positive or negative. By employing two counters of opposite senses, the difference between the two counts will equal the net number of events. However, such arrangements not only necessitate a needless duplication of equipment, but also are not direct reading and, consequently, cannot be employed for preset counting.

It is now proposed to provide a net positive digital counter which will be effective to record the net number of positive events which occur even though negative events are interspersed in the series of positive events. More particularly, this is to be accomplished by providing a negative count storage circuit which will record the number of consecutive negative events and a logic circuit adapted to count the completion of positive events only when there were no negative events previously stored in the storage circuit prior to the commencement of the positive event.

More particularly, this is to be accomplished by providing one or more multicathode, gaseous discharge tubes adapted to count positive and negative events according to their sense and to store a count of the negative events. If negative counts are stored the occurrence of an additional event will be counted according to the sense thereof. Thus, a negative event will increase the negative count, whereas a positive event will reduce the count. In the event the negative count has been reduced to zero, a gate circuit will be opened after the stored count is zero and the occurrence of any further positive events will be transferred through the gate to a conventional counter mechanism.

In the drawings:

FIGURE 3 is a wiring diagram of the circuit portion of FIGURE 1.

Figure 1:
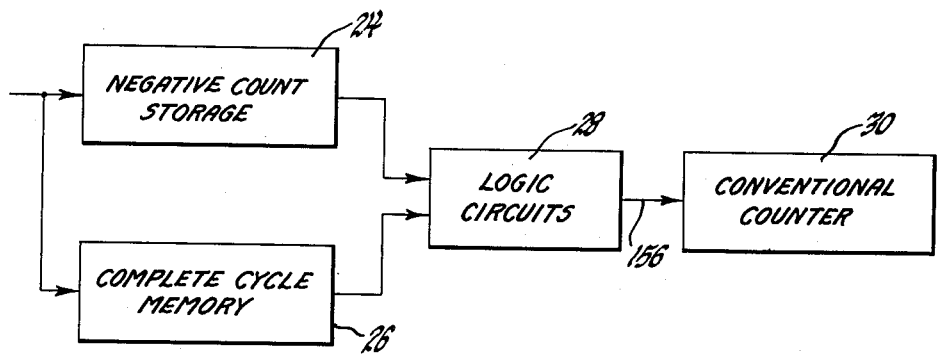
FIGURE 1 is a block diagram of a net positive digital counter embodying the present invention.

Referring to the drawings in more detail, the present invention is embodied in a digital counter for registering the net number of positive events which occur. The counter includes a pickup 22 that is sensitive to the occurrence of the events to be counted and is effective to produce a series of electrical signals indicative thereof. The pickup 22 is, in turn, connected to a negative count storage circuit 24 and a complete-cycle memory circuit 26 that are effective to feed a logic circuit 28 which, in turn, actuates a conventional recording counter 30.

In the present instance the pickup 22 has a pair of output conductors 32 and 34 that are each connected to the inputs of the negative count storage circuit 24 and also the inputs of the complete-cycle memory circuit 26. Whenever events are occurring, there will be a series of pulses on each of the conductors 32 and 34 with a separate pulse occurring in each conductor for each event. Although there will be an overlapping of the related pulses, the commencement and terminations thereof will correspond to the sense of the events, i.e., whether or not they are occurring in a positive or negative direction. More particularly, if a complete negative event occurs, a pulse will commence first in the conductor 32 and then the conductor 34. Subsequent to the commencement of the pulse in conductor 34, the pulse in conductor 32 will terminate and finally the pulse on conductor 34 will terminate. Conversely, if a complete positive event occurs, there will be a pulse in conductor 34 first, then a pulse in conductor 32, then the pulse in conductor 34 will terminate and, finally, the pulse in conductor 32 will terminate.

The negative count storage circuit 24 contains a conventional multi-cathode discharge tube 36 having an anode 33, a first set of guide pins 38, a second set of guide pins 40 and a plurality of output cathodes. Although there may be any number of these cathodes, in the present tube 36 there are ten output cathodes numbered, consecutively, $K_0$ to $K_9$ inclusive. These cathodes are symmetrically disposed around the anode 33 so as to be equally spaced therefrom and so as to have the guide pins 38 and 40 interspersed therebetween. Cathode $K_0$ is connected to ground by means of a load resistor 42 so that a voltage will appear across the resistor 42 if the discharge is located on the $K_0$ cathode. Cathode $K_1$ is connected to a second load resistor 44 which is, in turn, connected to a reset switch 46 that grounds the resistor when it is closed. Cathodes $K_3$ to $K_8$ are connected directly to the reset switch 46. Cathode $K_9$ is not connected to anything and has a floating potential. As a result, it may be seen that the discharge may settle on any of the cathodes $K_0$ to $K_8$. However, due to the floating potential of cathode $K_9$, it will be impossible for the discharge to settle thereon.

The first set of guide pins 38 contains ten pins that are interspersed between the various cathodes 0 to 9 and are all connected to the conductor 32. The second set of guide pins 40 are substantially identical to the first set 38 and are also interspersed between the cathodes and are connected to the conductor 34. It should be noted that each guide pin in one group is always disposed on the right side of its associated cathode, while each pin in the other group is disposed on the left side of its associated cathode. It may thus be seen that, when proceeding around the tube 36 in a negative direction, there will be a cathode, a guide pin in the first set 38, a guide pin in the second set 40, a cathode etc. However, when proceeding in a positive direction, the order will be reversed; i.e., a cathode, a guide pin in the second set 40, a guide pin in the first set 38, a cathode etc.

Thus, if a negative event occurs, the conductor 32 will apply a pulse to the guide pins in the first set 38 whereby the glow discharge will be transferred from the output cathode upon which it is located to the nearest guide pin in the first set 38. The second conductor 34 will then supply a second pulse to the second set of guide pins 40. Subsequent to this, the pulse on the first set of guide pins 38 will be removed, whereby the discharge will transfer from the guide pin in the first set 38 to the closest guide pin in the second set 40. Upon the completion of the event this second pulse will terminate and the discharge will transfer to the adjacent output cathode. It may thus be seen that the occurrence of a series of negative events will cause the discharge to be sequentially moved in a negative direction from cathode to cathode so that a negative count corresponding to the number of consecutive negative events will have been stored. It should be noted that, although there are only nine cathodes, in the present instance several discharge tubes may be cascaded to permit the storage of as many negative counts as will be required for the particular installation. In the embodiment illustrated, negative events transfer the discharge in a direction from $K_0$ to $K_1$ while positive events transfer the discharge in an opposite direction.

Whenever a positive event occurs, the pickup 22 will first supply a pulse to the guide pins in the second set 40, a pulse to the guide pins in the first set 38, remove the pulse from the second set 40 and then remove the pulse from the first set 38. As a result, a series of positive events will cause the discharge to be transferred in a positive direction from cathode to cathode so as to reduce the stored negative count by a number corresponding to the number of positive events that have occurred. However, since the number nine cathode is disconnected and has a floating potential, the discharge cannot be transferred beyond cathode $K_0$ even though a positive event occurs when there is no negative count previously stored. Accordingly, if the discharge is located on cathode $K_0$ and a positive event occurs, the discharge will be transferred to the guide pins but will then return to cathode $K_0$. Thus the only way for the discharge to arrive at cathode $K_0$ is for a positive event to occur.

It may thus be seen that, when more than one negative count is stored, there will be no signals across either of the resistors 42 or 44. However, if a single count is stored, there will be a square wave across the resistor 44 that will commence when the discharge settles on cathode $K_1$ and terminates when it leaves cathode $K_1$. Similarly, when the stored count is reduced to zero, there will be a square wave across the resistor 42 that will last for a period corresponding to the time the discharge is on cathode $K_0$. It should be noted that, since the stored count is zero when the discharge is on cathode $K_0$, whenever the discharge leaves $K_0$ an event will have started when no previous negative counts were stored. This condition will be unambiguously indicated by the termination of the square wave across resistor 42.

The complete-cycle memory circuit 26 includes a second multicathode, gaseous discharge tube 48 which is substantially identical to the first discharge tube 36 for storing counts. However, in this tube 48 every other cathode is connected together to form an odd set 50 that is grounded through a load resistor 54 while the remaining cathodes are connected together to form an even set 52 that is grounded through a second load resistor 56. The first set of guide pins 58 is connected to the first conductor 32 from the pickup and the second set of guide pins 60 is connected to the second conductor 34.

It may thus be seen that, normally, the discharge will be settled on one of the cathodes in the odd set 50 or one of the cathodes in the even set 52. The location of the discharge on the odd or even set 50 or 52 will be apparent by the voltage appearing across the odd or even resistors 54 and 56 resulting from the current of the discharge.

If an event of either sense, i.e., positive or negative, begins, the pulses produced by the pickup and present on the conductors 32 and 34 will be applied first to the guide pins in one or the other set depending on the sense of the event. This will thereby cause the discharge to be transferred from a cathode to the nearest guide pin in the set which is energized. If the event continues to occur, a second pulse will be applied to the guide pins forming the other set and the first pulse terminated. Only when the event is completed will the second pulse be terminated. When this pulse is terminated the discharge will transfer to the adjacent cathode. It may thus be seen that the completion of a positive or negative event will cause the discharge to transfer in a positive or negative direction respectively from a cathode in the odd or even set to the adjacent cathode in the other set. However, it may also be seen that, unless an entire event is completed, the discharge will not be transferred to another cathode but instead will remain on a guide pin or even be returned back to the original cathode. In other words, the discharge cannot be transferred from an odd cathode to an even cathode or vice versa unless the entire event is completed in either a positive or negative direction.

In order to raise the outputs from the negative storage discharge tube 36 and the complete cycle discharge tube 48 to more usable levels, four substantially identical buffer or squaring circuits 62, 64, 66 and 68 are provided. In the present instance each circuit includes a pair of interconnected vacuum tubes 70 and 72 that are arranged so that the output tube 72 is conducting or non-conducting according to the presence or absence respectively of an input signal on the grid 74 of the tube 70.

The grid 74 of the input tube 70 of the first squaring circuit 62 is capacitively coupled to the load resistor 42 by condenser 76 and resistors 78 and 80. The bias supplied through the resistor 80 to the grid 74 will normally retain the input tube 70 cut-off and the output tube 72 conducting. As a result of the plate current, the potential on the plate 82 will be depressed. However, when the discharge in the count storage tube 36 settles on the cathode $K_0$, a square wave voltage signal will appear across the load resistor 42. This will pass through the condenser 76 to the grid 74 and will cause the grid 74 of the input tube 70 to become sufficiently positive to cause the tube 70 to conduct. The plate current will cause an increase in the voltage drop across the plate load 84 and lower the potential on the grid 86 of the second tube 72 below cut off. As a result the plate voltage will rise to "B" supply voltage for a period corresponding to the time the discharge is on the cathode $K_0$. The output from square circuit 62 will be a square wave having a pulse width that is a function of the time that a signal is applied to grid 74. This square wave is applied to a differentiating and positive clipping circuit 128 and a negative pulse corresponding to the trailing edge of the square wave from circuit 62 is applied to grid 126.

The second squaring circuit 64 is substantially identical to the first circuit except that it provides a negative pulse voltage output as compared to the relatively positive voltage output of squaring circuit 62 and it is responsive to the drop across the load resistor 44 in the circuit of cathode $K_1$. This change in polarity of output can be accomplished in squaring circuit 64 by connecting the output lead to the plate of a tube that is equivalent to tube 70 in squaring circuit 62 rather than to the plate of a tube that would be equivalent to tube 72. It is seen that output lead 88 is connected with the grid of tube 114 through a differentiating and positive clipping circuit 130 which passes only negative pulses.

The third and fourth squaring circuits 66 and 68 have negative pulse outputs the same as squaring circuit 64 and are connected, respectively, to the load resistor 54 in the odd cathode circuit and to the load resistor 56 in the even cathode circuit and the outputs 90 and 92 thereof are connected to the plate of the input tubes the same as in the second squaring circuit 64. Thus, the potential of the output 90 of the third squaring circuit 66 will be high when the potential of the output 92 of the fourth squaring circuit 68 is low and vice versa. The particular condition, of course, will be determined by whether the discharge is on a cathode in the even set or a cathode in the odd set.

Figure 2:
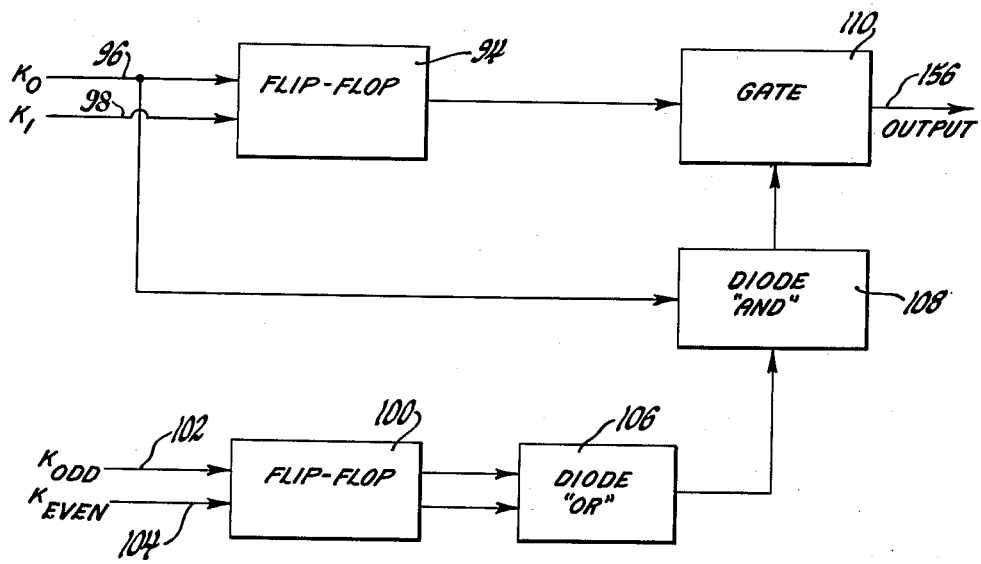
FIGURE 2 is a block diagram of the logic circuits employed in FIGURE 1.

The logic circuit 28 for actuating the counter 30 is shown in block form in FIGURE 2 and includes a first bistable flip-flop circuit 94 having a pair of inputs 96 and 98 coupled to the outputs of the first and second squaring circuits 62 and 64, a second bistable flip-flop circuit 100 having a pair of inputs 102 and 104 that are capacitively coupled to the outputs of the third and fourth squaring circuits 66 and 68, a diode "OR" circuit 106 interconnected with the output of the second flip-flop circuit 100, a diode "AND" circuit 108 interconnected with the output of the "OR" circuit 106 and with the output of the first squaring circuit 62 and also a gate circuit 110 interconnected with the output of the first flip-flop circuit 94 and triggered by the "AND" circuit 108.

More particularly, the first flip-flop circuit 94 is of conventional design and includes a pair of vaccum tubes 112 and 114 that have the cathodes interconnected through a common cathode biasing circuit 116 and the plates 118 and 120 connected to the high voltage source by separate load resistors 122 and 124. The control grid 126 of the first tube 112 is coupled to the output of the first squaring circuit 62 by means of a differentiating and positive clipping circuit 128. The control grid 127 of the second tube 114 is coupled to the output of the second squaring circuit 64 by a differentiating and positive clipping circuit 130. The flip-flop circuit 62, as is well known to those skilled in the art, will have two stable states of operation. In one state of operation, the tube 112 is conducting and the tube 114 is non-conductive. In the other state of operation, the tube 114 is conducting and tube 112 is non-conducting. If one of the differentiating circuits 128 or 130 applies a negative pulse to the grid of the conducting tube, that tube will be driven non-conductive and the other tube conductive. Another negative pulse to the same tube will then not change the conducting conditions of the tubes. More particularly, if the first tube 112 is conducting and the discharge passes across cathode $K_0$, a square wave pulse will be applied to the input grid 74 of the first squaring circuit 62 so as to produce a positive square wave pulse at the output. This wave, in turn, will be fed to the differentiating and positive clipper circuit 128. This circuit will then supply a negative pulse to the grid of the input tube 112 at the same time that the square wave terminates. This is coincident with the discharge leaving the $K_0$ cathode and is an unambiguous indication that no negative counts were stored when the event started. This negative pulse will cut off the tube 112 and cause the plate voltage to rise to a higher positive level. Tube 112 will continue to be non-conductive until a negative pulse is applied to the grid 127 of the second tube 114 to cut it off. This occurs when the discharge hits cathode $K_1$ and causes a negative pulse in the output of the second squaring circuit 64. The beginning of this negative pulse will be effective to cause a negative pulse to pass through the differentiating and positive clipping circuit 130 and cut off the second tube 114. In order to more fully describe the foregoing action, it is pointed out that the output voltage from flip-flop 94 will be developed at the top end of resistor 136 which is connected between a negative potential and the plate 118 of tube 112. When tube 112 is non-conducting, the potential of the top end of resistor 136 rises sharply positive and drops sharply when tube 112 is conducting. It thus is seen that with tube 112 conducting, there is no voltage developed to attempt to turn gate tube 132 on. On the other hand, there is a voltage developed to turn gate tube 132 on when tube 112 is non-conducting. Non-conduction of tube 114 will not cause a voltage rise to attempt to turn gate tube 132 on.

The gating circuit 110 includes a vacuum tube 132 that has the control grid 134 directly connected to the plate 118 of the first tube 112 of the flip-flop circuit 94 and also to a fixed negative bias voltage source 136. Normally, this bias source 136 will be able to maintain the grid 134 below cut-off bias so that the gate 110 will be closed. However, when the first tube 112 in the flip-flop circuit 94 becomes non-conductive, the grid 134 of the tube 132 in the gate 110 will swing sufficiently positive to permit the tube 132 to become conductive and to permit the passage of counting pulses therethrough.

The second flip-flop circuit 100 is substantially identical to the first flip-flop circuit 94 in that it has a pair of interconnected tubes which are alternatively conductive. The plates of the tubes of flip-flop 100 are, however, connected with circuits 142 and 144 whereas flip-flop 94 has only one output from plate 118. The control grid of the first tube is connected to the plate of the input tube of the third squaring circuit 66 by a differentiating and positive clipper circuit 138 that is connected to the plate of the input tube in the third squaring circuit 66 responsive to the voltage across the load resistor 64 forming the output of the odd cathode set. The control grid of the second tube is connected to the plate of the input tube of the fourth squaring circuit 68 by a differentiating and positive clipper circuit 140. This circuit 140 is fed from the plate of the input tube in the fourth squaring circuit 68 so as to be responsive to the voltage across the resistor 56 forming the output of the even cathode set. Thus, this flip-flop circuit 100 will also have two stable states, i.e., one tube is conducting and the other tube is non-conducting or the reverse thereof depending upon whether the discharge is located on an even cathode or an odd cathode. However, when the discharge moves from a cathode in one set to a cathode in the other set, the positive pulse applied to the grid of the non-conducting tube will cause the circuit 100 to shift to the other stable condition.

Each plate in the second flip-flop circuit 100 is connected respectively to differentiating and negative clipping circuits 142 and 144 which are arranged to act as an "OR" circuit 106. Each of these circuits 142 and 144 includes a load resistor 146 so that when the plate voltage of either tube in the flip-flop circuit 100 increases, there will be a positive pulse across the resistor 146. Since this resistor 146 is connected to a grid 148 in the gate 110 through the "AND" circuit, it will raise the potential thereof to a more positive level for a short time. It may thus be seen that there will be no positive pulse on the resistor 146 unless an event is completed and that such a pulse will be an unambiguous indication of the completion of an event irrespective of the sense of the event which occurred.

The grid 148 of the gate tube 132 is also connected to an "AND" circuit 108 that includes diodes 157 and 153 and the resistor 155. The "AND" circuit is also connected with capacitor 150, resistor 152 connected to junction 151 and diode 154. The "AND" circuit 108 is connected to the second plate 82 in the first squaring circuit 62 so that it will receive the square wave pulse occurring when the discharge settles on cathode $K_0$. This will result in a positive pulse combining with any positive pulses that occur in the "OR" circuit 106. If the two pulses occur simultaneously, the resultant pulse will be of sufficient amplitude to cause a positive pulse to occur in the output 156 of the gate 110 if it was open at the time the pulses occur.

In order to register a positive count, it is essential that three conditions exist: (1) No negative counts were stored prior to the commencement of the event; (2) the event must be completed, and (3) the completed event occurred in a positive sense. When the discharge settles on cathode $K_0$, there will be no negative counts stored when the event is completed. Consequently, whenever the discharge leaves cathode $K_0$, there will have been no counts stored at the beginning of the event. Thus, the first condition will be unambiguously indicated by the voltage across the resistor 42 dropping to zero. This voltage drop will result in the bias on the input grid 74 of the squaring circuit 62 being removed, a drop of the voltage on the differentiating and positive clipper circuit 128, a negative pulse on the grid of the first tube 112 in the flip-flop circuit 94, cut off of the first tube 112 and conduction of the second tube 114 if this condition did not previously exist, an increase in the potential of the plate 118 and a corresponding positive increase in the potential on the control grid 134 so as to permit the tube 132 to conduct and thereby open the gate 110 so that any signals may be passed to the counter 30.

When the discharge in the second discharge tube 48 transfers from a cathode in one set to a cathode in the other set, a complete event has occurred. Thus the second condition will be indicated by the potentials across the resistors 54 and 56 reversing. This voltage change will result in the conduction in the squaring circuits 66 and 68 reversing, a negative pulse being applied to grid of one of the tubes in the flip-flop circuit 100 so as to change the status thereof from one stable condition to the other, a positive pulse appearing across the resistor 146 and a positive pulse flowing to the grid 148 of the gate 110 providing the "AND" circuit has received a pulse from grid 82 of tube 72.

When the discharge arrives at the cathode $K_0$, it must have moved from the cathode $K_1$ or have returned to $K_0$ after leaving the same and moving in a positive direction across the adjacent guide pins. Either of these conditions necessitates a positive event. Thus the third condition will be indicated by the voltage across resistor 42 increasing. This voltage increase will result in the first tube 70 in the squaring circuit 62 becoming conductive and the second tube 72 becoming non-conductive. This will cause a voltage to be applied to the "AND" circuit and if another voltage pulse is applied to the "AND" circuit from the "OR" circuit, an attempt will be made to gate the tube 132 on.

It will be apparent from the foregoing that during the time that the discharge is on the cathode $K_1$ the gate 132 will be closed. It also will be apparent that when the discharge leaves cathode $K_0$ the gate 132 will open. With the gate open it couples the "AND" circuit signal to the output terminal providing a signal has been produced by the "OR" circuit indicative of a completed event.

The circuiting of this invention is thus such that the counter will only be actuated when the discharge is transferred from cathode $K_0$ to the guide pins and back to $K_0$ providing there is a completed event. If the discharge is transferred in a negative direction from cathode $K_0$ to cathode $K_1$ the gate will be closed when the discharge settles on $K_1$ to prevent actuation of the counter. When the discharge is being transferred between the cathodes other than $K_0$ and $K_1$ the gate 132 remains closed so that the counter is not actuated.

It is intended now to describe the operation of this counting circuit as the discharge is transferred between cathodes in the negative storage counting tube 36. Assume first that the discharge is on cathode $K_0$ and that the discharge will be transferred to cathode $K_1$ by proper signals from source 22. This event is in a negative direction so that the counter 30 will not be actuated. In addition when the discharge is transferred to cathode $K_1$ at the end of the cycle one negative count will be stored.

As the discharge leaves cathode $K_0$, the voltage will decrease that was developed across resistor 42 which will correspond to the trailing edge of a square wave voltage that was started when conduction began on $K_0$. The pulse of voltage developed across resistor 42 causes squaring circuit 62 to develop a positive pulse of voltage which decreases as the discharge leaves $K_0$ and causes a negative pulse to be applied to grid 126 of tube 112 through circuit 128. This negative pulse coincides in time with the decrease in voltage across resistor 42 and drives tube 118 non-conductive and tube 114 conductive. Flip-flop 94 has an output and attempts to open gate tube 132. It thus can be seen that the transferring of the discharge from cathode $K_0$ has attempted to open the gate tube 132. This transferring of conduction from cathode $K_0$ satisfies condition one noted above but there are two other conditions to fulfill if the counter 30 is to be actuated.

The third condition noted above will not be fulfilled since the count is in a negative direction. Thus, as the discharge left $K_0$ and the voltage decreased across resistor 42, there is no output from squaring circuit 62 to one side of diode 157 and the gate 132 therefore cannot remain open since the "AND" circuit will not permit this. The counter therefore cannot be actuated even though the first condition for actuation is met.

When the pulse transfers to cathode $K_1$, a voltage is developed across resistor 44. This causes a negative pulse to be delivered to the grid of tube 114 through the action of squaring circuit 64 and circuit 130. Tube 114 is now driven non-conductive and tube 112 conductive. The arrival of the discharge on cathode $K_1$ will thus reduce the output of flip-flop 94 so that it no longer biases the gate tube 132 to a conductive condition.

The second condition noted above, that being that a completed event has occurred, will be met by the transfer of discharge to $K_1$ since the discharge will shift in tube 48 and through squaring circuits 66 and 68 and flip-flop 100 will cause a positive voltage one side of diode 153 of the "AND" circuit.

In summary, it can be seen that during the transfer of discharge from cathode $K_0$ to $K_1$ the first and second conditions noted above that are required for counting were met but since the third condition was not met, the counter 30 is not actuated.

If it is assumed now that the discharge is transferred from cathode $K_1$ back to cathode $K_0$, the counter 30 will not be actuated since even though the event is now in a positive direction, one negative count is now being stored. In such a transfer, conditions two and three will be met but condition one which requires that no negative counts were stored prior to the commencement of the event will not be met.

As the discharge leaves cathode $K_1$, the voltage across resistor 44 drops to zero. This will not effect the flip-flop circuit 94 since no negative pulse will be passed to it. As the discharge arrives at cathode $K_0$, a voltage is developed across resistor 42. This voltage will cause an output from squaring circuit 62 to diode 157 to attempt to turn on gate tube 132 but causes no negative pulse on the grid of tube 112 to drive it non-conductive. Since an event has been completed, a pulse is applied to diode 153 to also attempt to drive tube 132 on. The "AND" circuit now will drive grid 148 positive but since there is no output from flip-flop 94 to grid 134, the counter 30 is not actuated. If the discharge now transfers from cathode $K_0$ to a guide pin and back to cathode $K_0$, the counter 30 will be actuated by one count since all three conditions for counting are met. As the discharge leaves $K_0$, the drop in voltage across resistor 42 results in a negative pulse being applied to grid 126 of tube 112 due to squaring circuit 62 and circuit 128. Tube 112 if conductive is driven non-conductive and if non-conductive, remains non-conductive. With tube 112 non-conductive, grid 134 of gate tube 132 is biased to cause tube 132 to conduct. When the discharge returns to cathode $K_0$, the flip-flop circuit 94 is not effected so that tube 112 remains non-conductive and grid 134 remains biased positive. Since an event is completed by transfer of glow in tube 48, a positive voltage appears at one side of diode 153 as the discharge returns to $K_0$. A positive voltage also now appears at one side of diode 157 since the voltage rise on resistor 42 will cause this by the output from squaring circuit 62. The "AND" circuit now causes grid 148 to go positive and since grid 134 is positive, the counter 30 is actuated.

It can be seen that transfer of discharge from cathode $K_1$ to cathode $K_2$ will only store negative events since only the third condition for counting is met. The same is true for transfers of discharge beyond cathode $K_2$ in the negative direction.

It is to be understood that, although the invention has been described with specific reference to a particular embodiment thereof, it is not to be so limited since changes and alterations therein may be made which are within the full intended scope of this invention as defined by the appended claims.

We claim:

1. A net positive digital counter comprising, a storage circuit for storing a plurality of counts corresponding to the number of events of one sense which have occurred, means including a multicathode discharge tube responsive to the completion of an event, and counting means separate from said storage circuit for indicating a count only when an event of an opposite sense is completed and there are no counts previously stored in said storage circuit prior to the commencement of the event.

2. In a device of the class described, the combination comprising, means for producing a series of signals indicative of the occurrence of the first and second events of opposite sense, a first multicathode gaseous discharge tube connected with said means for storing events of said first sense, means including a second multicathode gaseous discharge tube connected with said first means and responsive to the completion of an event, and counter means connected with said discharge tubes effective to count an event of said second sense whenever such an event is completed and there are no counts of said first sense stored in first discharge tube.

3. In a device of the class described, the combination comprising, means for producing a series of signals indicative of the occurrence of positive and negative events, a first multicathode gaseous discharge tube connected with said means for storing negative events, first and second resistors connected in the cathode circuits of adjacent cathodes of said tube, a second multicathode gaseous discharge tube connected with said means having adjacent pairs of cathodes connected with different output circuits, a gate circuit, a counter connected to respond to the output of said gate circuit, means connected with said gate circuit and with said first and second resistors for controlling the conduction of said gate circuit as a function of the voltages appearing across said resistors, and means connecting the output circuits of said second multicathode discharge tube with said gate circuit.

4. In a system of the class described, the combination comprising, first means for producing a series of signals indicative of the sense and number of a series of events, a multicathode discharge tube connected with said first means, counting means, and means for actuating said counting means in response to the discharge on a cathode of said multicathode discharge tube leaving said cathode and then returning to said same cathode during the application of a signal applied to said tube which is indicative of the occurrence of only one event.

5. In a system of the class described, the combination comprising, first means for producing a series of signals indicative of the sense and number of a series of events, a multicathode discharge tube to be connected with said first means having a first cathode disconnected from any power source whereby the discharge in said tube cannot be transferred to said first cathode, means connected with a second cathode and located adjacent said first cathode for developing a control voltage, a gate circuit, and means for controlling said gate circuit in accordance with said control voltage.

6. In a counting system, the combination comprising, a source of information, a multicathode discharge tube connected with said source of information, the character of the information from said source being such that a discharge can be transferred from cathode to cathode in said tube in either direction, said tube being connected such that with the discharge on a predetermined cathode the input information causes the discharge to leave said cathode and then immediately return to said cathode, and counting means operated in response to the leaving of the discharge from said cathode and the immediately subsequent returning of the discharge to said cathode during the application of a signal to said tube which is indicative of the occurrence of only one event.

7. A counting system comprising, a gate circuit having a pair of control electrodes, a source of information indicative of a series of events of different sense, storage means for storing events of one sense connected with said source of information, means for applying a signal to one of the electrodes of said gate circuit when said storage means is storing no counts of said one sense, an "AND" circuit having a pair of inputs and an output connected with the other of said gate electrodes, means for causing a signal to be applied to one of the inputs of said "AND" circuit when an event has been completed in either sense, and means for at times causing a signal to be applied to the other input terminal of said "AND" circuit as a result of the event occurring in a predetermined sense.

8. A counting system comprising, means for producing signals indicative of the number and sense of a series of events, storage means for storing counts of one sense, a counter means for producing a first signal voltage when there are no counts stored in said storage means, means separate from said storage means for producing a second signal voltage when an event has been completed, means for producing a third signal voltage when the event occurs in a direction opposite to that that can be stored by said storage means, and means for actuating said counter when said first, second and third signal voltage are occurring simultaneously.

9. A counting system comprising, means having an output providing signals indicative of the number and sense of a series of events, storage means connected with said first means for storing counts of one sense, means indicating a first condition that there are no events stored in said storage means at the beginning of an event, means indicating a second condition that the event occurred in a sense opposite to the sense of counts that can be stored by said storage means, means separate from said storage means indicating a third condition that the event was a completed event, a counter, and means connecting said counter and indicating means whereby said counter is actuated only when said first, second and third conditions are fulfilled.

10. In a counting system of the type described, the combination comprising, a multicathode discharge tube, means feeding input information to said tube consisting of the number and sense of a series of events, a first resistor connected with a first cathode of said tube, a second resistor connected with a second cathode of said tube that is located adjacent said first cathode, first and second squaring circuits a flip-flop circuit having an output terminal and a pair of input terminals connected in circuit respectively with said first and second resistors through said first and second squaring circuits, a gate circuit connected with the output terminal of said flip-flop circuit, and a counter connected with said gate circuit.

11. In a device of the class described, the combination comprising, a pick-up responsive to a series of events for producing signals indicative of the number and sense of said events, a multicathode discharge tube for storing a number corresponding to the occurrence of the events of one sense, means separate from said multicathode discharge tube and connected with said pick-up responsive to the completion of an event of either sense, and means for counting the completion of events of an opposite sense that occur only when said multicathode discharge tube does not have a count stored therein of said one sense and only when an event is completed.

(References on following page)

References Cited in the file of this patent

UNITED STATES PATENTS

| | | |
|---|---|---|
| 2,685,082 | Beman et al. | July 27, 1954 |
| 2,781,975 | Pudelko et al. | Feb. 19, 1957 |
| 2,789,766 | Wood | Apr. 23, 1957 |
| 2,790,110 | Applegate | Apr. 23, 1957 |
| 2,829,269 | Peacock | Apr. 1, 1958 |
| 2,833,476 | Hayes et al. | May 6, 1958 |
| 2,921,233 | Gordberg | Jan. 12, 1960 |
| 2,964,241 | Rosenberg | Dec. 13, 1960 |
| 2,966,613 | Chao | Dec. 27, 1960 |
| 2,975,329 | Irvine et al. | Mar. 14, 1961 |

FOREIGN PATENTS

| | | |
|---|---|---|
| 766,311 | Great Britain | Jan. 23, 1957 |
| 786,166 | Great Britain | Nov. 13, 1957 |